United States Patent [19]

Read

[11] 4,022,427
[45] May 10, 1977

[54] SLEEVE VALVE MANDREL AND SEAL MEANS FOR INDEXING VALVE ASSEMBLY

[75] Inventor: Norman Weldon Read, Dallas, Tex.

[73] Assignee: Dresser Industries, Inc., Dallas, Tex.

[22] Filed: Feb. 7, 1975

[21] Appl. No.: 548,065

Related U.S. Application Data

[63] Continuation-in-part of Ser. No. 494,424, Aug. 5, 1974, abandoned.

[52] U.S. Cl. .............................. 251/343; 166/330; 251/171; 251/175; 251/310; 251/317; 251/363; 251/DIG. 1
[51] Int. Cl.² .................................. F16K 31/00
[58] Field of Search .......... 251/171, 172, 175, 314, 251/316, 340, 341, 343, 344, 345, 360, 363, 309–312; 137/625.17, 625.47, 625.41; 166/226

[56] References Cited

UNITED STATES PATENTS

| | | | |
|---|---|---|---|
| 3,061,267 | 10/1962 | Hamer | 251/172 |
| 3,072,379 | 1/1963 | Hamer | 251/171 |
| 3,364,443 | 1/1968 | Stiegler et al. | 251/175 |
| 3,423,067 | 1/1969 | Foster | 251/316 |
| 3,828,817 | 8/1974 | Anderson | 137/625.47 |
| 3,840,048 | 10/1974 | Moen | 137/625.41 |
| 3,848,849 | 6/1973 | Alexander | 251/314 |

Primary Examiner—William R. Cline
Assistant Examiner—H. Jay Spiegel
Attorney, Agent, or Firm—Michael J. Caddell

[57] ABSTRACT

A two piece valve sleeve mandrel utilizes replaceable insert seal carriers having peripheral elastomeric sealing areas thereon which may be partially or fully pressure-balanced.

3 Claims, 11 Drawing Figures

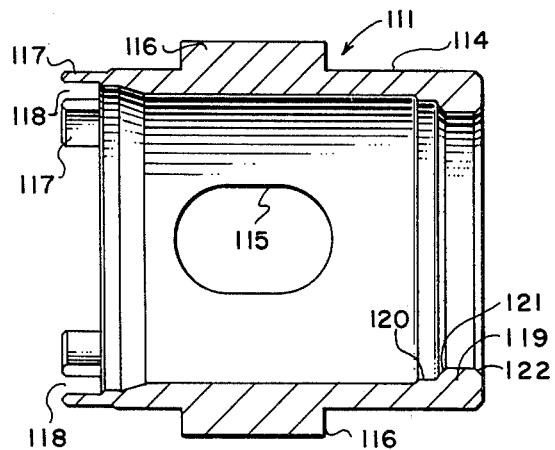
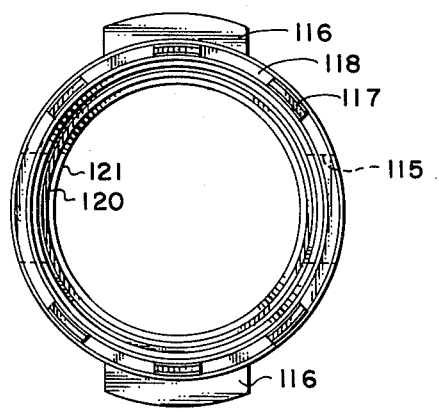
FIG. 2A  FIG. 2B
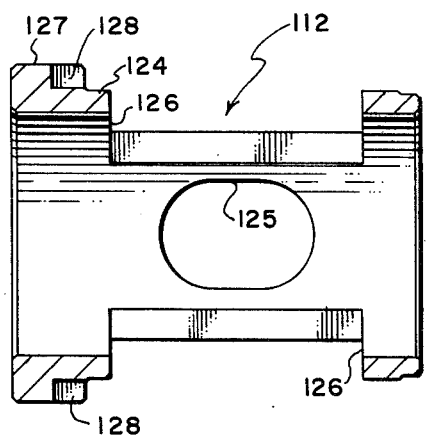
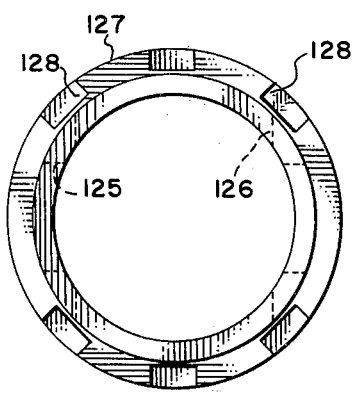
FIG. 3A  FIG. 3B
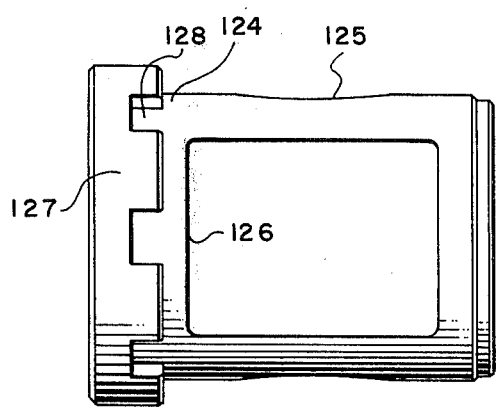
FIG. 3C

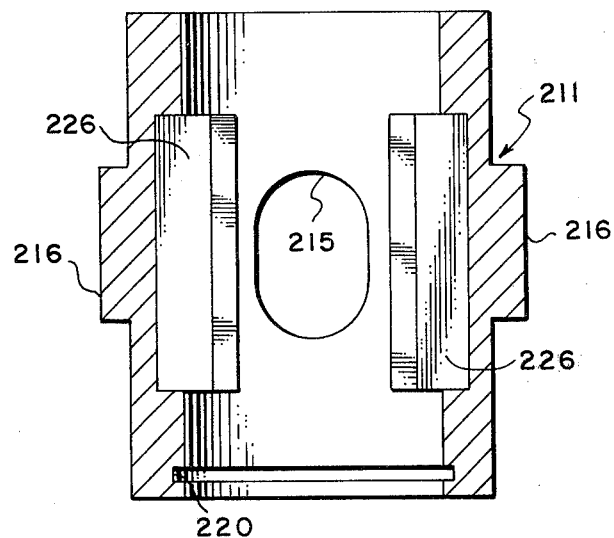
F I G. 5

SLEEVE VALVE MANDREL AND SEAL MEANS FOR INDEXING VALVE ASSEMBLY

CROSS-REFERENCE TO RELATED APPLICATION

This application is a continuation-in-part of an original application Ser. No. 494,424 filed Aug. 5, 1974, now abandoned, by Norman Weldon Read, entitled "SLEEVE VALVE MANDREL AND SEAL MEANS FOR INDEXING VALVE ASSEMBLY"; and is related to a prior application, Ser. No. 298,107, now U.S. Pat. No. 3,815,676, filed Oct. 16, 1972, by Norman Weldon Read, entitled "INDEX EQUALIZING VALVE FOR RETRIEVABLE WELL PACKER". The above Read patent is hereby incorporated by reference into this application.

BACKGROUND OF THE INVENTION

This application involves an improvement over certain features of the above-mentioned patent. Specifically this invention provides an improved sleeve valve assembly to replace that dislcosed in FIGS. 6 and 7 of the incorporated Read patent.

The cited portions of the Read patent dislcose a valve sleeve having a mandrel with external gudgeon pins and a pair of ports spaced 180° apart around the valve. An elastomeric seal sleeve is located on the inside surface of the valve sleeve.

Although the valve assembly of the Read patent is a significant improvement over the existing art and performs well, it was desirable to obtain a valve assembly having seals with great sealing ability but with reduced resistance to rotation.

This invention provides such a valve assembly utilizing replaceable metal seal inserts having a peripheral seal area on one or both sides and capable of obtaining pressure balancing across the seal area.

BRIEF DESCRIPTION OF THE DRAWINGS

FIG. 2a is a side section view of the outer sleeve housing;

FIG. 2b is a top view of the housing of FIG. 2a;

FIG. 3a is a side section view of the inner sleeve housing;

FIG. 3b is a bottom view of the housing of FIG. 3a;

FIG. 3c is a side view of the housing rotated 90° from that of FIG. 3a;

FIG. 5 is a lateral side view of a vertical cross-section of the housing body of an alternate embodiment.

DESCRIPTION OF THE PREFERRED EMBODIMENTS

Figure 1:
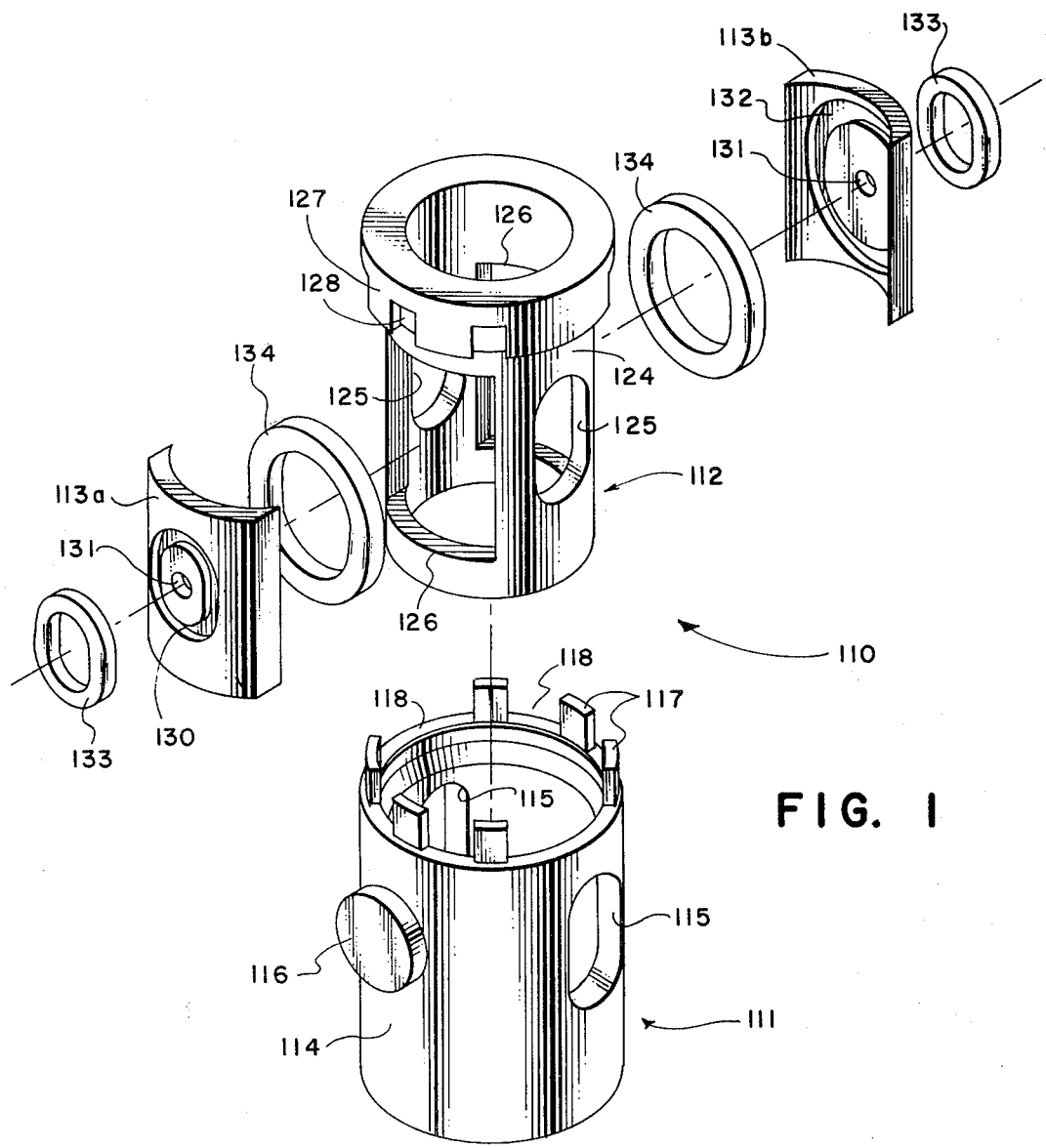
FIG. 1 is an exploded isometric assembly view of the valve assembly showing the relationship of the parts.

The valve sleeve assembly 110 is illustrated in an exploded assembly view in FIG. 1 and comprises an outer seal housing 111, an inner sleeve seal retainer housing 112, and seal inserts 113a and 113b.

Referring to FIGS. 1, 2a and 2b, the outer housing 111 is illustrated as having a generally cylindrical tubular body 114 having two ports 115 through the wall thereof and spaced 180° apart and two gudgeon pins 116 extending radially outward from the body, 180° apart and 90° from the ports 115.

At the top of housing 111 are spaced locking lugs 117 extending upward and formed from the wall of body 114 by machining away spaces 118 from the wall. An inner annular stepped flange 119 extends radially inward from the lower end of the wall of body 114. The flange has step 120 and beveled shoulders 121 and 122.

FIGS. 1 and 3a through 3c illustrate the inner housing and seal carrier sleeve 112 having a generally cylindrical tubular body section 124 with two ports 125 through the wall thereof, spaced 180° apart. Two rectangular seal windows 126 are formed through the wall of body section 124, spaced 180° apart, and rotated 90° from ports 125. FIG. 3c illustrates a full view of one of the windows 126, while FIG. 3a shows a side cross-sectional view through the centerline of the windows.

A raised annular shoulder portion 127 is formed externally on one end of sleeve 112 and contains machined slots 128 extending partially therethrough, matching and complementing the upward extending locking lugs 117 on housing 111.

Figure 4A:
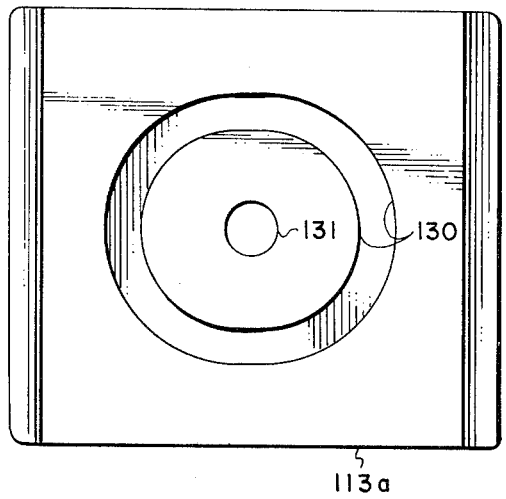
FIG. 4a is an outside front view of one insert seal.
Figure 4B:
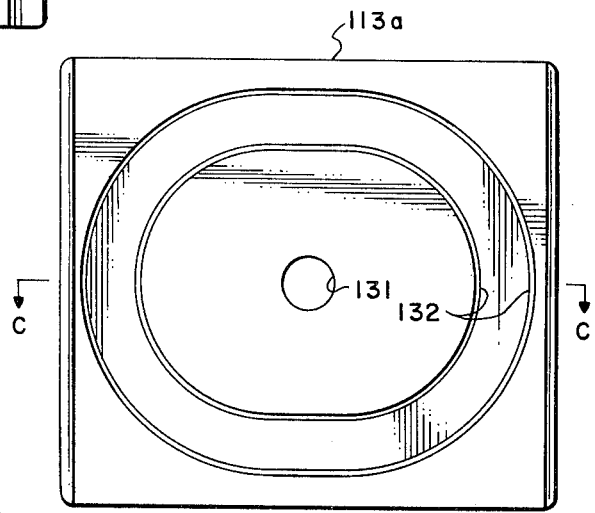
FIG. 4b is an inside front view of an insert seal.
Figure 4C:
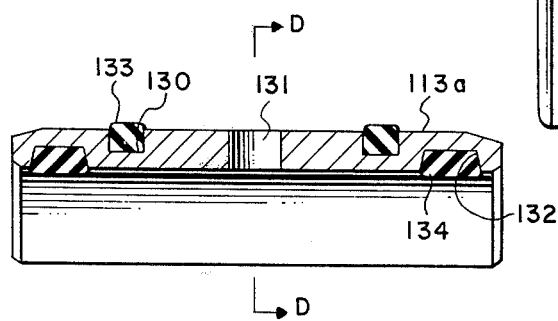
FIG. 4c is a side cross-sectional view of an insert seal taken at line c—c of FIG. 4b.
Figure 4D:
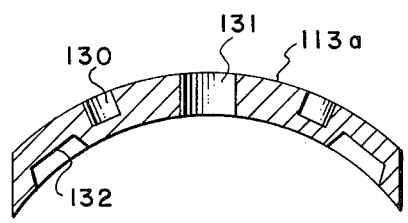
FIG. 4d is an axial cross-sectional view of a seal taken at line d—d of FIG. 4c.

Rectangular arcuate seal inserts 113a and 113b are illustrated in FIGS. 4a through 4d. FIG. 4a shows an outside plan view of the inserts and illustrates an elastomeric seal channel 130 ovally encircling a central port 131 passing through the insert. A similar oval seal channel 132 is formed on the inside of the inserts as illustrated in the inside plan view 4b. A cross-sectional side-view of the insert in FIG. 4c and cross-sectional axial end view of FIG. 4d show the relationship of the seal groove channels in the insert leaf. Broad, flat oval seal member 134 is cemented or bonded in channel 132 as illustrated in FIG. 4c. Seal 133, located in channel 130, may also be cemented or bonded in place if desirable, but this is not required.

When assembled in the indexing valve of the aforementioned Read patent, the valving assembly herein disclosed functions as an integral unit. The rectangular seal inserts 113a and 113b are located, in relatively snug-fitting relationship, in the windows 126 of inner sleeve 112. Sleeve 112 is relatively closely fitted within housing 111 with lugs 117 engaged in locking relationship in matching spaces 128. The inner sleeve 112 and outer housing 111 are maintained in locked relationship by abutment above and below with other portions of the indexing valve mechanism.

The inner seal 134 contacts portion 54 of mandrel 14 of the indexing valve assembly as illustrated in the incorporated Read patent. The outer seal is in constant sealing contact with the inner wall of the outer housing 111.

During the operation of the indexing valve assembly, the ports 59 of mandrel 14 as shown in the Read patent, FIG. 4, are aligned with ports 115 of this valving apparatus 110 and flow through the valve is achieved. When the indexing valve is manipulated to close ports 59, assembly 110 is rotated or "indexed" 90° to place the seal inserts 113a and 113b over ports 59. Seal grooves 132 are made in a large enough oval to completely surround port area 59 and provide sealing capability between ports 59 and the interior of the inserts 113. Since ports 131 through the inserts allow pressure to pass therethrough, the oval seals 133 provide sealing between the inserts and the inner wall of housing 111.

Seals 133 may be left out of the assembly by plugging ports 131 but no pressure balancing is achieved and the pressure force outward or inward on the seal inserts 113 is determined by the entire area of the insert located within seal 134.

In the embodiment shown in FIGS. 4a through 4d, a partial pressure balancing of the seal insert is achieved by transferring pressure through ports 131 to the low pressure side of the insert. The force due to pressure differential is determined by the difference in areas enclosed by seals 133 and the areas enclosed by seals 134.

A complete pressure balance may be achieved by making the enclosed areas within seals 133 equal to the enclosed areas within seals 134. This would mean that portions of the seal grooves 130 and 132 would lie radially in line with each other which would require a much thicker insert to prevent intersection of the two grooves and cutting through of the entire thickness of the insert. This thicker insert may be desirable in instances where the tool inner diameter is not critical and high differential pressures make pressure-balancing necessary. In the present embodiment, one seal groove was made in a smaller oval to fall inside of the radial projection of the other groove and prevent cutting through of the relatively thin insert leaf. This relationship of the seal grooves is clear from studying FIG. 4d. The pressure imbalance from the difference in diameters of the oval seals 133 and 134 is relatively small and is not sufficient to cause high rotational friction between assembly 110 and mandrel 59 of the patented mechanism nor will it cause undersirable extrusion of the elastomeric seal out of its channel.

FIG. 5 illustrates a lateral side view in vertical cross-section of the housing body of an alternate embodiment. In this embodiment, the outer housing 111 and seal retainer housing 112 of FIG. 1 have been formed as a single tubular body member 211.

Body 211 is a tubular member adapted for sliding telescopic engagement over a ported mandrel such as that illustrated in FIS. 1A and 1B of the above mentioned Read patent. Body 211 has a pair of opposed ports 215 passing laterally through the wall thereof. A pair of arcuate seal insert recesses 226 are formed in the inner wall of body 211 spaced opposite from each other and angularly displaced from ports 215. A pair of gudgeon pins 216 extend radially outward from body 211 at 180 degree spacing from each other and spaced approximately 90 degrees from ports 215.

Recesses 226 are arranged to receive in relatively closefitting relationship the seal inserts 113a and 113b as illustrated in FIGS. 4a through 4d.

Operation of the assembly is analogous to operation of the first embodiment with the housing 211 operating as would the locked assembly of housings 111 and 112.

The advantages of the present invention include the greatly reduced rotational friction between the valve assembly 110 and the mandrel upon which it rotates. This is because the actual contact area of the elastomeric seals 133 is only a small fraction of the area of the elastomeric seal covering the entire inner bore of the patented mechanism. This rotational friction is even further reduced by making the seal insert partially or wholly pressure balanced thereby reducing the force holding the seal against the mandrel.

Furthermore, the use of the floating type insert seal provides a more flexible and efficient seal against the inner mandrel with just the minimum use of elastomeric material.

Also, the strength of the seal is maximized by having metal support both on the inside edge and the outside edge of each seal. This is provided by the channel in the seal insert which retains the seal and provides the two-way lateral support as well as the radial support. This is an improvement over the large sheath type seal used previously which allowed pressure extrusion and bubbling of the sheath type seal arising from gas penetration through the large seal area.

Although a specific preferred embodiment of the present invention has been described in the detailed description above, the description is not intended to limit the invention to the particular forms of embodiments disclosed therein, since they are to be recognized as illustrative rather than restrictive and it will be obvious to those skilled in the art that the invention is not so limited. For example, whereas rectangular arcuate seal inserts are illustrated this could be square or curved. Also where oval seals are depicted, these could be circular or rectangular. The seal grooves could be dovetail grooves with a wide bottom and narrow top to provide tighter seal control or possibly the use of o-ring type seals. Thus, the invention is declared to cover all changes and modifications of the specific example of the invention herein disclosed for purposes of illustration which do not constitute departures from the spirit and scope of the invention.

The embodiments of the invention in which an exclusive property of privilege is claimed are defined as follows:

1. A sleeve valve for use over a ported member for alternately opening and closing the ports in the ported member, said sleeve valve comprising:
   a generally cylindrical tubular housing adapted to be telescoped over a ported member and having ports through the wall alignable with ports in the ported member;
   a ported carrier sleeve slidably telescoped within said housing, having ports aligned with said housing ports, and further having two diametrically opposed windows through the wall thereof angularly displaced from said sleeve ports;
   locking means between said housing and said sleeve adapted to prevent rotational movement therebetween;
   two seal inserts, one in each of said windows, said seal inserts being arcuate plates with curvature substantially the same as the curvature of said carrier sleeve, said inserts having seal receiving channels on the inside surface thereof arranged to encircle the ports on the ported member; and,
   resilient seals in each of said inserts arranged to seat in said receiving channels and abut the ported member and form a fluid-tight seal therebetween.

2. The sleeve valve of claim 1 further comprising second resilient seals on the opposite sides of said seal inserts from the first of said resilient seals, and port means communicating through said inserts within said first and second seals, said inserts having channels for receiving said second seals, and said second seal abutting the inner wall of said housing in sealing relationship therewith.

3. The sleeve valve of claim 1 further comprising indexing abutment means projecting radially outward from said housing.

* * * * *

UNITED STATES PATENT OFFICE
CERTIFICATE OF CORRECTION

Patent No. 4,022,427      Dated May 10, 1977

Inventor(s) Norman Weldon Read

It is certified that error appears in the above-identified patent and that said Letters Patent are hereby corrected as shown below:

In column 4, line 60, change "seal" in the second occurrence to "seals".

Signed and Sealed this sixteenth Day of August 1977

[SEAL]

Attest:

RUTH C. MASON
*Attesting Officer*

C. MARSHALL DANN
*Commissioner of Patents and Trademarks*